Dec. 17, 1935.                    O. KASELITZ                    2,024,370
                         PRODUCTION OF POTASSIUM NITRATE
                               Filed April 12, 1932
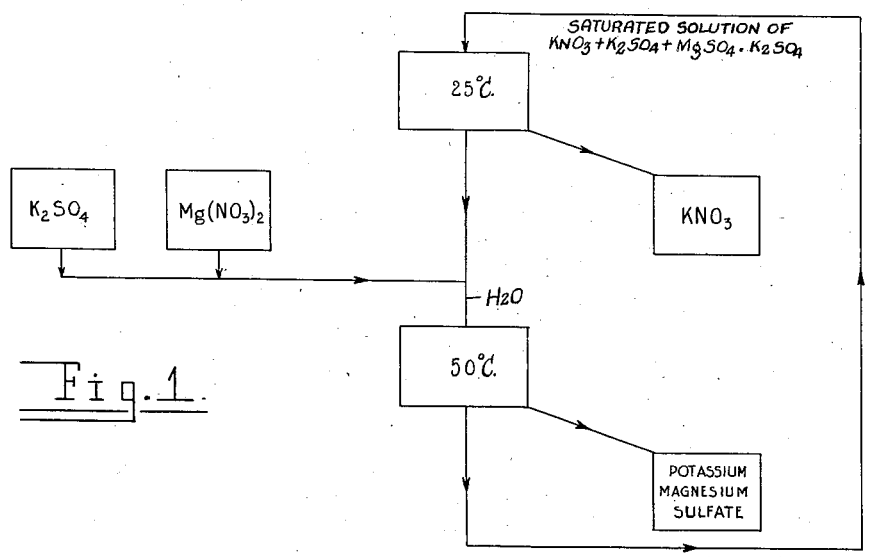
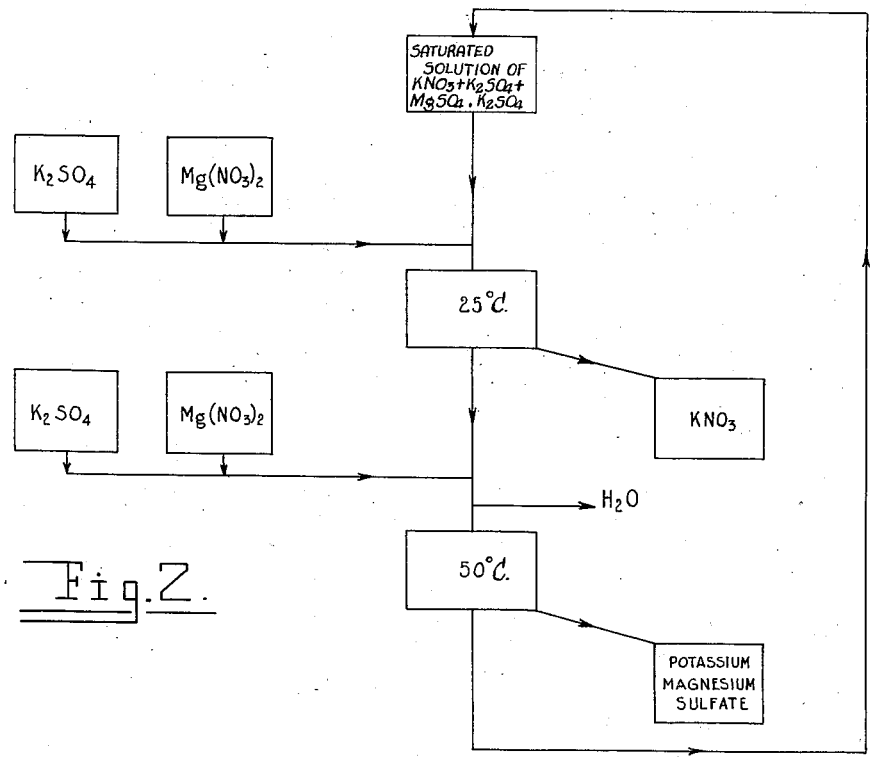
Inventor
Oscar Kaselitz
by Karl Michaelis att.

Patented Dec. 17, 1935

2,024,370

UNITED STATES PATENT OFFICE 2,024,370

PRODUCTION OF POTASSIUM NITRATE

Oskar Kaselitz, Berlin, Germany

Application April 12, 1932, Serial No. 604,873
In Germany September 1, 1931

11 Claims. (Cl. 23—102)

My invention refers to the production of potassium nitrate from potassium sulfate. It is an object of my invention to provide an improved method which is more efficient and less liable to cause losses in available nitrogen than other methods heretofore known.

If it is desired to convert potassium chloride into potassium nitrate the starting product is treated as a rule with magnesium nitrate and water, whereby potassium nitrate is separated out, while magnesium chloride remains in solution together with some potassium chloride. In order to dispose of this mother liquor and to recover therefrom the dissolved potassium, this liquor must be evaporated to a considerable extent, so that carnallite crystallizes out. This double salt must be washed in order to avoid losses in available nitrogen, but considerable difficulties are encoutered in view of the high solubility of this double salt. The decomposition of the carnallite in order to recover the potassium chloride contained therein also causes considerable losses in potassium chloride.

According to my invention I avoid these drawbacks by a conversion method, which consists, broadly speaking, in converting magesium nitrate and potassium sulfate in the presence of water into potassium nitrate and potassium-magnesium sulfate $K_2SO_4MgSO_4$, which is easily handled and can be utilized without suffering any losses in available nitrogen or in potassium, in accordance with the following equation:

$$Mg(NO_3)_2 + 2K_2SO_4 = 2KNO_3 + MgSO_4.K_2SO_4$$

In practising my invention I provide a watery solution of potassium nitrate, potassium sulfate and potassium magnesium sulfate, which is saturated with respect to these salts at an elevated temperature, for instance at 50° C. On cooling such solution to lower temperatures, for instance to 25° C. or to 0° C., pure potassium nitrate separates out while the mother liquor remains saturated with potassium nitrate. I now add potassium sulfate and magnesium nitrate, I then heat the solution to evaporate part of the water, and I so control the proportions of the two additions and of the evaporated water that the double salt potassium-magnesium sulfate $K_2SO_4MgSO_4$ separates out in an amount equivalent to the potassium nitrate separated in the first step. In this way the starting solution is regenerated and can be used for the recovery of further amounts of potassium nitrate.

The temperature at which the starting solution should be saturated, and the temperature to which it should be cooled when separating out the potassium nitrate, can be varied within wide ranges, and I wish it to be understood that my invention is not limited to any exact saturating or separating temperature, the only condition being that the saturating temperature is higher than the separating temperature. The best yields are however obtained if the solution is saturated at a temperature of about 50° C., so that it contains about

| Mg | $(NO_3)_2$ | $K_2$ | $SO_4$ | $H_2O$ |
|---|---|---|---|---|
| 1.5% | 23.0% | 13.9% | 5.3% | 56.3% | and is cooled in the separating step to temperatures not above 25° C., still lower temperatures, for instance a temperature of 0° C. being preferred.

The amount of potassium nitrate which can be separated from a given volume of the starting solution, can be materially increased by adding to this solution before cooling additional quantities of potassium sulfate and magnesium nitrate in such proportions that the mother liquor obtained on cooling and on separating the potassium nitrate is saturated also with regard to the double salt potassium-magnesium sulfate. Such a mother liquor may also be treated in the subsequent step with potassium sulfate and magnesium nitrate at an elevated temperature, whereupon any surplus water is evaporated and potassium magnesium sulfate is separated out so as to exactly regenerate the starting solution.

The evaporation of water mentioned above should be controlled to expel exactly that quantity, which is introduced into the solution in the form of water of crystallization when using solid magnesium nitrate having the formula $Mg(NO_3)_2.6H_2O$, for otherwise the solution would not regain its starting composition. In order to avoid the evaporating step, I may, however, form the magnesium nitrate within the solution by adding thereto magnesium oxide, hydroxide, carbonate or basic magnesium carbonate and nitric acid or nitrous gases and air or oxygen for instance the gases formed in the process of oxidizing ammonia, whereby magnesium nitrate is formed, while the introduction of additional water is avoided.

If the washing liquors obtained by washing the ultimately obtained potassium nitrate or the ultimately obtained potassium magnesium sulfate shall be utilized in the process, I may add them to the mother liquor prior to evaporation, but the amount of water which must be evaporated is thereby increased. In such cases I may also form the magnesium nitrate within the solution as explained above in order to reduce the proportion of water which must be eliminated by evaporation.

The potassium-magnesium sulfate precipitated in the process is separated from the mother liquor and may be washed with water or, preferably, with suitable solutions saturated with potassium-magnesium sulfate, and washing may be continued until the salt is substantially free from nitrogen compounds. It may be dried and used as fertilizer or as an addition in the production of mixed fertilizers, but as it contains considerable quantities of magnesium, which are frequently not desired, I may also decompose the salt by treating it with regulated quantities of water to recover the potassium sulfate component as such, which may be returned into the cycle. In practising my invention I may for instance proceed as follows:

*Example 1*

557 kgs. of a solution containing 1.5 per cent Mg
23.0 per cent $NO_3$
13.9 per cent K
5.3 per cent $SO_4$
56.3 per cent $H_2O$ as obtained in a prior operation at a temperature of 50° C., are cooled to about 25° C., whereby 100 kgs. of solid potassium nitrate are precipitated in a crystalline form. To the mother liquor separated from the solid salt 126.6 kgs. magnesium nitrate ($Mg(NO_3)_2.6H_2O$) and 172.4 kgs. potassium sulfate are added, and the mixture is heated to evaporate 17.8 kgs. water. On cooling to about 50° C., 181.2 kgs. potassium-magnesium sulfate crystallize out and on separation there are obtained 570.0 kgs. of a mother liquor which is identical with the starting solution in weight, composition and temperature.

*Example 2*

To 381 kgs. of a starting solution, as described with reference to Example 1 are added under stirring 33.6 kgs. magnesium nitrate ($Mg(NO_3)_2.6H_2O$)

and 20.8 kgs. potassium sulfate and the mixture is allowed to cool down to about 25° C., whereby 100.0 kgs. potassium nitrate are precipitated. To the mother liquor separated from the solid potassium nitrate 93.0 kgs. magnesium nitrate ($Mg(NO_3)_2.6H_2O$)

and 151.6 kgs. potassium sulfate are added, the mixture is heated and 70.8 kgs. water are evaporated. On cooling to about 50° C. there are precipitated 181.2 kgs. potassium magnesium sulfate. The mother liquor separated therefrom has exactly the volume, composition and temperature of the starting solution.

In the accompanying flow sheet,

Fig. 1 illustrates the process of Example 1,
Fig. 2 the process of Example 2.

Various changes may be made in the details disclosed in the foregoing specification without departing from the invention or sacrificing the advantages thereof.

I claim:—

1. The method of producing potassium nitrate comprising cooling a solution saturated at an elevated temperature with respect to potassium nitrate and substantially also with respect to potassium sulfate and potassium magnesium sulfate to precipitate potassium nitrate, separating the potassium nitrate, incorporating with the mother liquor potassium sulfate and magnesium nitrate, heating this mixture, to evaporate part of the water cooling it to a limited extent so that potassium magnesium sulfate separates out, and reusing the resultant liquor in cycle, taking care to regulate the percentage of water in the liquor in such manner that the quantity and concentration of the liquor are equal to those of the starting solution.

2. The method of producing potassium nitrate comprising cooling a solution saturated at an elevated temperature with respect to potassium nitrate and substantially also with respect to potassium sulfate and potassium magnesium sulfate to precipitate potassium nitrate, separating the potassium nitrate, incorporating with the mother liquor potassium sulfate and magnesium nitrate, heating this mixture to evaporate part of the water, cooling it to a limited extent so that potassium-magnesium sulfate separates out, controlling the quantity of the evaporated water, of the precipitated potassium magnesium sulfate and the additions of potassium sulfate and magnesium nitrate while considering the quantity of crystal water in the magnesium nitrate added and in the potassium-magnesium sulfate precipitated, so as to ultimately obtain a liquor corresponding to the starting solution with respect to quantity and composition, and reusing this liquor in cycle.

3. The method of producing potassium nitrate comprising cooling a solution saturated at a temperature of about 50° C. with respect to potassium nitrate, and substantially also with respect to potassium sulfate and potassium magnesium sulfate to a temperature substantially not exceeding 25° C. to precipitate potassium nitrate, separating the potassium nitrate, incorporating with the mother liquor potassium sulfate and magnesium nitrate, heating this mixture to evaporate part of the water, cooling it to a limited extent, so that potassium magnesium sulfate separates out, and reusing the resultant liquor in cycle, taking care to regulate the percentage of water in the liquor in such manner that the quantity and concentration of the liquor are equal to those of the starting solution.

4. In the method as claimed in claim 3, the step of so controlling the two precipitation steps, that potassium nitrate and potassium-magnesium sulfate are separated out in the proportion of two to one.

5. The method of producing potassium nitrate from potassium sulfate, comprising providing a solution saturated at an elevated temperature with respect to potassium nitrate and substantially also with respect to potassium sulfate and potassium magnesium sulfate, adding to this solution regulated amounts of magnesium nitrate and potassium sulfate, cooling this solution so as to obtain a precipitation of substantially pure potassium nitrate, separating the potassium nitrate, incorporating with the mother liquor thus obtained potassium sulfate and magnesium nitrate, heating this mixture to evaporate water, cooling it to a limited extent so that potassium magnesium sulfate separates out, and reusing the resultant liquor in cycle, taking care to regulate the evaporation of the water in such manner, that the quantity and concentration of the reused liquor is equal to those of the starting liquor.

6. In the method claimed in claim 1, the step of incorporating with the mother liquor magnesium nitrate by adding thereto a basic magnesium compound and a nitrogen-oxygen compound which will react to form the nitrate.

7. In the method as claimed in claim 5, the step of incorporating with the mother liquor magnesium nitrate by adding thereto a basic magnesium compound and a nitrogen-oxygen compound which will react to form the nitrate.

8. In the method claimed in claim 1, the step of incorporating with the mother liquor magnesium nitrate by adding thereto a basic magnesium compound and nitric acid.

9. In the method claimed in claim 1, the step of incorporating with the mother liquor magnesium nitrate by adding thereto a basic magnesium compound and nitrous gases, which will react to form the nitrate.

10. In the method as claimed in claim 5, the step of incorporating with the mother liquor magnesium nitrate by adding thereto a basic magnesium compound and nitric acid.

11. In the method as claimed in claim 5, the step of incorporating with the mother liquor magnesium nitrate by adding thereto a basic magnesium compound and nitrous gases, which will react to form the nitrate.

OSKAR KASELITZ.